(12) United States Patent
Konishi et al.

(10) Patent No.: US 12,240,975 B2
(45) Date of Patent: Mar. 4, 2025

(54) EPOXY RESIN COMPOSITION, INTERMEDIATE SUBSTRATE, AND FIBER-REINFORCED COMPOSITE MATERIAL

(71) Applicant: Toray Industries, Inc., Tokyo (JP)

(72) Inventors: Daisuke Konishi, Ehime (JP); Yuichi Yamakita, Ehime (JP); Hideki Hanabusa, Ehime (JP); Noriyuki Hirano, Ehime (JP); Masahiro Tsuzuki, Ehime (JP)

(73) Assignee: Toray Industries, Inc., Tokyo (JP)

( * ) Notice: Subject to any disclaimer, the term of this patent is extended or adjusted under 35 U.S.C. 154(b) by 665 days.

(21) Appl. No.: 17/601,813

(22) PCT Filed: Apr. 1, 2020

(86) PCT No.: PCT/JP2020/014989
§ 371 (c)(1),
(2) Date: Oct. 6, 2021

(87) PCT Pub. No.: WO2020/217894
PCT Pub. Date: Oct. 29, 2020

(65) Prior Publication Data
US 2022/0177696 A1 Jun. 9, 2022

(30) Foreign Application Priority Data

Apr. 25, 2019 (JP) ................................ 2019-083826
Apr. 25, 2019 (JP) ................................ 2019-083827

(51) Int. Cl.
| | | |
|---|---|---|
| C08L 63/00 | (2006.01) | |
| C08G 59/22 | (2006.01) | |
| C08G 59/40 | (2006.01) | |
| C08G 59/42 | (2006.01) | |
| C08G 59/50 | (2006.01) | |
| C08G 59/68 | (2006.01) | |
| C08G 59/72 | (2006.01) | |
| C08J 5/04 | (2006.01) | |

(Continued)

(52) U.S. Cl.
CPC .............. *C08L 63/00* (2013.01); *C08G 59/22* (2013.01); *C08G 59/4021* (2013.01); *C08G 59/4078* (2013.01); *C08G 59/4253* (2013.01); *C08G 59/50* (2013.01); *C08G 59/68* (2013.01); *C08G 59/72* (2013.01); *C08J 5/04* (2013.01); *C08J 5/10* (2013.01); *C08J 5/249* (2021.05); *C08J 2363/00* (2013.01); *C08J 2451/04* (2013.01); *C08L 2205/035* (2013.01); *C08L 2207/53* (2013.01)

(58) Field of Classification Search
CPC .............. C08L 63/00; C08L 2205/035; C08L 2207/53; C08J 5/249; C08J 5/10; C08J 5/04; C08J 2363/00; C08J 2451/04; C08G 59/4021; C08G 59/4078; C08G 59/4253; C08G 59/68; C08G 59/22; C08G 59/50; C08G 59/72
See application file for complete search history.

(56) References Cited

U.S. PATENT DOCUMENTS

| | | | |
|---|---|---|---|
| 8,425,747 B2 | 4/2013 | Schulte et al. | |
| 9,725,567 B2 * | 8/2017 | Wang .................. | C08G 59/4246 |
| 10,889,695 B2 | 1/2021 | Okamoto et al. | |
| 2011/0048948 A1 | 3/2011 | Schulte et al. | |
| 2013/0202873 A1 * | 8/2013 | Mizuki .................... | C08J 5/249 |
| | | | 525/92 H |

FOREIGN PATENT DOCUMENTS

| | | | | |
|---|---|---|---|---|
| CN | 109370496 A | | 2/2019 | |
| EP | 590975 A1 * | | 4/1994 | ........... C08G 59/145 |
| JP | 5224287 A | | 2/1977 | |
| JP | 03190920 A | | 8/1991 | |
| JP | 09157498 A | | 6/1997 | |
| JP | 09227693 A | | 9/1997 | |

(Continued)

OTHER PUBLICATIONS

Machine English translation of WO 2018/181849, Miyake et al., Oct. 2018.*

(Continued)

*Primary Examiner* — Patrick D Niland
(74) *Attorney, Agent, or Firm* — Buchanan Ingersoll & Rooney PC

(57) ABSTRACT

The purpose of the present invention is to provide an epoxy resin composition which exhibits a high level of deforming capacity and fracture toughness and from which a resin cured product maintaining heat resistance can be obtained. The epoxy resin composition according to the present invention satisfies condition 1 or condition 2 below, wherein the resin cured product obtained by reacting the epoxy resin composition at 150° C. for 60 minutes has a tensile elongation at break of 7% or more. Condition 1: including all the following components [A], [B], and [C], component [A]: a bifunctional aliphatic epoxy resin having a specific structure, component [B]: a terminal carboxy-modified acrylic rubber, and component [C]: a dicyandiamide. Condition 2: including the following components [D], [E], and [F] and satisfying conditions [a] and [b] below, component [D]: core-shell type rubber particles, component [E]: a boric ester compound, component [F]: a curing agent, condition [a]: including 9-18 parts by mass of component [D] with respect to 100 parts by mass of the total epoxy resin, and condition [b]: 0.003≤(the content of component [E]/the content of component [D])≤0.05.

5 Claims, No Drawings

(51) Int. Cl.
*C08J 5/10* (2006.01)
*C08J 5/24* (2006.01)

(56) References Cited

FOREIGN PATENT DOCUMENTS

| | | | |
|---|---|---|---|
| JP | 2011515546 A | 5/2011 | |
| JP | 2011157491 A | 8/2011 | |
| JP | 2019059911 A | 4/2019 | |
| WO | 2017099060 A1 | 6/2017 | |
| WO | WO-2018181849 A1 * | 10/2018 | ............. C08G 59/40 |

OTHER PUBLICATIONS

Machine English translation of JP 1997-157498, Kawachi et al., Jun. 1997.*
Extended European Search Report for EP Application No. 20794093.3, dated Oct. 10, 2022, 7 pages.
International Search Report and Written Opinion for International Application No. PCT/JP2020/014989, dated Jun. 23, 2020, 8 pages.

* cited by examiner

EPOXY RESIN COMPOSITION, INTERMEDIATE SUBSTRATE, AND FIBER-REINFORCED COMPOSITE MATERIAL

CROSS REFERENCE TO RELATED APPLICATIONS

This is the U.S. National Phase application of PCT/JP2020/014989, filed Apr. 1, 2020 which claims priority to Japanese Patent Application No. 2019-083826, filed Apr. 25, 2019 and Japanese Patent Application No. 2019-083827, filed Apr. 25, 2019, the disclosures of each of these applications being incorporated herein by reference in their entireties for all purposes.

FIELD OF THE INVENTION

The present invention relates to an epoxy resin composition preferably used as a matrix resin of a fiber-reinforced composite material suitable for sports applications and general industrial applications, an intermediate base material such as a tow prepreg and a prepreg using the epoxy resin composition as a matrix resin, and a fiber-reinforced composite material.

BACKGROUND OF THE INVENTION

Epoxy resin compositions are widely used as matrix resin of fiber-reinforced composite materials by taking advantage of the characteristics of being excellent in high heat resistance, adhesiveness, and mechanical strength. For producing a fiber-reinforced composite material, an intermediate base material in which reinforcing fibers are impregnated with a matrix resin in advance is often used because of easy conveyance and shape imparting. Examples of the form of the intermediate base material include a prepreg in which reinforcing fibers are arranged in a sheet shape, and an intermediate base material having a narrow width such as a tow prepreg and a yarn prepreg in which reinforcing fibers are impregnated with a matrix resin (hereinafter, a tow prepreg).

With the expansion of application of intermediate base materials to general industrial applications including automobile members, improvement in long-term durability of fiber-reinforced composite materials is desired. Increasing the deformability and toughness value of the matrix resin (epoxy resin) is necessary to achieve this.

Patent Document 1 describes a technique for improving the surface quality and fracture toughness of a tow prepreg including an epoxy resin composition by using the epoxy resin composition containing a large amount of core-shell type rubber particles.

Patent Document 2 discloses a low-viscosity epoxy resin composition in which the fracture toughness value of a cured epoxy resin is increased by using fine particles containing a rubber component and insoluble in an epoxy resin and a monofunctional or bifunctional epoxy resin in combination.

Patent Document 3 describes an epoxy resin composition for a tow prepreg in which a low-viscosity epoxy resin and core-shell type rubber particles are used in combination to increase the fracture toughness value of a cured resin.

Patent Document 4 discloses a technique for improving the storage stability of a prepreg by using a particulate amine compound and a boric acid ester compound in combination.

PATENT DOCUMENTS

Patent Document 1: WO 2017/099060 A

Patent Document 2: Japanese Patent Laid-open Publication No. 9-227693

Patent Document 3: Japanese Patent Laid-open Publication No. 2011-157491

Patent Document 4: Japanese Patent Laid-Open Publication No. 9-157498

SUMMARY OF THE INVENTION

To enhance the deformability, a method of lowering the crosslinking density of a cured epoxy resin is generally known. To increase the toughness value, a technique of adding particles insoluble in an epoxy resin is known. However, applying a technique of lowering the crosslinking density of a cured epoxy resin causes a fiber-reinforced composite material to have insufficient mechanical strength and heat resistance because the elastic modulus and heat resistance of the cured epoxy resin greatly reduces. In addition, the method of adding a large amount of particles increases the viscosity of the epoxy resin composition and thus the amount of the particles to be added is limited from the viewpoint of the production process. Therefore, it desired to construct a technique that achieves both deformability and fracture toughness without impairing mechanical strength and heat resistance.

The epoxy resin composition described in Patent Document 1 contains a large amount of core-shell type rubber particles. The mechanical properties of the cured resin are not sufficient. In addition, there is no mention about improvement in deformability.

The epoxy resin compositions described in Patent Documents 2 and 3 exhibit a relatively high fracture toughness value, but the epoxy resin compositions often contain a monofunctional or bifunctional epoxy resin and are low in tensile elongation and heat resistance probably because of insufficient crosslinking.

Patent Document 4 discloses an epoxy resin composition having excellent storage stability and a relatively high fracture toughness value, but does not suggest or mention the elongation of a cured resin.

An object of the present invention is to provide an epoxy resin composition capable of improving the drawbacks of the prior art and obtaining a cured resin that exhibits a high level of deformability and fracture toughness and maintains heat resistance, an intermediate base material including the epoxy resin composition and a reinforcing fiber, and a fiber-reinforced composite material obtained by curing the intermediate base material.

As a result of intensive studies to solve the above problems, the inventors of the present invention have found an epoxy resin composition having the following constituents, and completed the present invention. That is, the epoxy resin composition according to embodiments of the present invention is an epoxy resin composition satisfying condition 1 or condition 2 shown below, wherein a cured resin obtained by reacting the epoxy resin composition at 150° C. for 60 minutes has a tensile elongation at break of 7% or more.

Condition 1: the epoxy resin composition includes all of components [A], [B], and [C] shown below:
[A] a bifunctional aliphatic epoxy resin represented by formula (I) shown below:

[Chemical Formula 1]

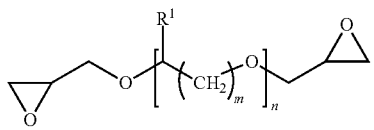
(I)

(In the formula (I), $R^1$ represents a hydrogen atom or a methyl group, and n and m each independently represent an integer of 1 to 6.)
[B] a terminal carboxy-modified acrylic rubber
[C]: dicyandiamide
Condition 2: the epoxy resin composition includes components [D], [E], and [F] shown below, and satisfies conditions [a] and [b] shown below:
[D] a core-shell type rubber particle
[E] a boric acid ester compound
[F] a curing agent
[a]: the epoxy resin composition includes 9 to 18 parts by mass of the component [D] per 100 parts by mass of total epoxy resin
[b] $0.003 \leq$ (content of the component [E]/content of the component [D]) $\leq 0.05$ In the present specification, in the epoxy resin composition of the present invention, an epoxy resin composition satisfying the above condition 1 may be referred to as an aspect 1 of the epoxy resin composition of the present invention, and an epoxy resin composition satisfying the above condition 2 may be referred to as an aspect 2 of the epoxy resin composition of the present invention.

The intermediate base material according to embodiments of the present invention includes a reinforcing fiber impregnated with the epoxy resin composition according to embodiments of the present invention.

The fiber-reinforced composite material according to embodiments of the present invention includes a cured product of the intermediate base material according to embodiments of the present invention.

According to the present invention, it is possible to provide an epoxy resin composition capable of obtaining a cured resin that exhibits a high level of deformability and fracture toughness and maintains heat resistance.

DETAILED DESCRIPTION OF EMBODIMENTS OF THE INVENTION

For the epoxy resin composition according to embodiments of the present invention, a cured resin obtained by reacting the epoxy resin composition at 150° C. for 60 minutes has a tensile elongation at break of 7% or more. When the tensile elongation at break of the cured resin is less than 7%, the mechanical properties, particularly the deformability, of a fiber-reinforced composite material including the epoxy resin composition as a matrix resin are deteriorated, and thus the fracture strength and the long-term durability (fatigue properties) are insufficient. The upper limit of the tensile elongation at break is not particularly limited and is about 20%.

First, Aspect 1 of the epoxy resin composition of the present invention will be described. In the present specification, Aspects 1 and 2 of the epoxy resin composition of the present invention may be simply referred to as Aspects 1 and 2 of the present invention. The term "the present invention" without specifying aspects refers to all aspects of Aspects 1 and 2.

Aspect 1 of the present invention satisfies condition 1. That is, Aspect 1 of the present invention includes component [A] a bifunctional aliphatic epoxy resin represented by the formula (I), component [B] a terminal carboxy-modified acrylic rubber, and component [C] dicyandiamide as essential components. These constituent elements will be described first.

(Component [A])

The component [A] in the present invention is a bifunctional aliphatic epoxy resin represented by the formula (I) shown below.

[Chemical Formula 2]

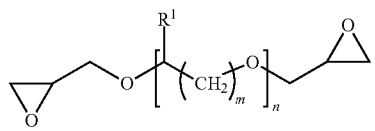
(I)

In the formula (I), $R^1$ represents a hydrogen atom or a methyl group. Also, n and m each independently represent an integer of 1 to 6.

Examples of the component [A] include aliphatic epoxy resins such as ethylene glycol diglycidyl ether, propylene glycol diglycidyl ether, trimethylene glycol diglycidyl ether, and hexamethylene glycol diglycidyl ether.

As ethylene glycol diglycidyl ether, "DENACOL" (registered trademark) EX-850, EX-851, and EX-821 (all manufactured by Nagase ChemteX Corporation), and the like may be used. As propylene glycol diglycidyl ether, "DENACOL" (registered trademark) EX-911, EX-941, and EX-920 (all manufactured by Nagase ChemteX Corporation), "ADEKA GLYCIROL" (registered trademark) ED-506 (manufactured by ADEKA CORPORATION), and the like may be used. As hexamethylene glycol diglycidyi ether, "DENACOL" (registered trademark) EX-212 and the like may be used.

Aspect 1 of the present invention preferably includes the component [A] in an amount of 3 to 20 parts by mass, more preferably 6 to 10 parts by mass, per 100 parts by mass of total epoxy resin. Satisfying the above-described range can effectively reduce the viscosity of the epoxy resin composition without impairing the heat resistance of the cured epoxy resin.

(Component [B])

The component [B] included in Aspect 1 of the present invention is a terminal carboxy-modified acrylic rubber. Blending the component [B] in the epoxy resin composition can increase the fracture toughness without decreasing the tensile elongation at break of the cured resin.

As the component [B], "Hypro" (registered trademark) 1300X31, 1300X13, 1300X13NA, and 1300X8 (all manufactured by CVC Thermoset Specialties), and the like may be used.

Aspect 1 of the present invention needs to simultaneously include the component [A] and the component [B]. Only the component [A] or the component [B] cannot achieve both the tensile elongation at break and the resin toughness value at a high level, but including both at the same time can achieve both the tensile elongation at break and the resin toughness value at a high level. The reason for this is not clear, but for example, it can be presumed that the component [B] forms a flexible cross-linked structure after the curing reaction because the component [B] has a reactive carboxy group at the terminal.

Here, the tensile elongation at break, the tensile elastic modulus, and the tensile strength of the cured product obtained by curing the epoxy resin composition of the present invention are evaluated by performing a tensile test on a cured resin plate processed into a dumbbell shape according to JIS K7161 (1994).

The resin toughness value of the cured epoxy resin of the present invention is evaluated from the K1c value obtained from the SENB test described in ASTM D5045-99.

The heat resistance of the cured epoxy resin of the present invention is evaluated from a glass transition temperature calculated from a heat flow obtained by performing temperature rise measurement of DSC measurement (differential scanning calorimetry). The glass transition temperature is measured by the method described in JIS K7121 (1987).

(Component [C])

The component [C] according to embodiments of the present invention is dicyandiamide. Dicyandiamide is a compound represented by the chemical formula $(H_2N)_2C=N-CN$. Dicyandiamide is excellent in that it can impart high dynamic characteristics and heat resistance to a cured epoxy resin obtained using dicyandiamide as a curing agent, and is widely used as a curing agent for epoxy resins. Examples of commercially available products of dicyandiamide include DICY7T and DICY15 (both manufactured by Mitsubishi Chemical Corporation).

Aspect 1 of the present invention preferably includes component [H]: a curing accelerator. The component [C] in combination with a curing accelerator such as an aromatic urea compound (component [H]) can decrease the curing temperature of the epoxy resin composition compared with the case where the component [C] is blended alone. Examples of the component [H] include 3-(3,4-dichlorophenyl)-1,1-dimethylurea (DCMU), 3-(4-chlorophenyl)-1,1-dimethylurea, phenyldimethylurea (PDMU), and 2,4-toluenebis(3,3-dimethylurea) (TBDMU). Examples of commercially available products of the aromatic urea compound include DCMU99 (manufactured by Hodogaya Chemical Co., Ltd.), "Omicure" (registered trademark) 24 (manufactured by PTI Japan Ltd.), and "Dyhard" (registered trademark) UR505 (4,4'-methylenebis(phenyldimethylurea), manufactured by AlzChem Trostberg GmbH).

Here, in Aspect 1 of the present invention, it is preferable to use TBDMU as the component [H]. Using the component [C] and TBDMU in combination may further increase the heat resistance and the tensile elongation at break at the same time. Aspect 1 of the present invention preferably includes TBDMU in an amount of 1.2 to 4.0 parts by mass, further preferably 2.5 to 3.5 parts by mass, per 100 parts by mass of total epoxy resin. By using the intermediate base material obtained by impregnating a reinforcing fiber with the epoxy resin composition satisfying the above-described range, a homogeneous fiber-reinforced composite material is obtained, because the gelation start time of the epoxy resin composition is shortened at the time of thermal curing, and thus dripping and local resin flow are suppressed in the molding process.

Here, the gelation start time of the epoxy resin composition of the present invention may be evaluated in accordance with ASTM E2039 by using, as an index, the time until the degree of curing of the epoxy resin composition reaches 20%, which is obtained from dielectric measurement.

(Component [D])

Aspect 1 of the present invention preferably includes 4 to 18 parts by mass of a core-shell type rubber particle as the component [D] per 100 parts by mass of total epoxy resin. Particularly preferably, the mass ratio of the content of the component [B] to the content of the component [D] (content of the component [B]/content of the component [D]) is in the range from 0.1 to 0.8. Here, the core-shell type rubber particle is a particle in which a shell component is modified on the surface of a particulate core component, and is a particle in which a part or the entire surface of the core component is coated with the shell component. The constituent elements of the core and shell components are not particularly limited as long as they have core and shell components.

The epoxy resin composition satisfying the above-described range remarkably improves the fracture toughness and the tensile elongation at break of the cured epoxy resin, and thus the fracture strength and the fatigue characteristics of the fiber-reinforced composite material are particularly excellent. The above effect further exceeds the level that can be exhibited by the combination of the components [A] and [B], and is an effect of improving specific fracture elongation and fracture toughness found in the presence of the component [ID].

As the component [D], "KaneAce" (registered trademark) MX-125, MX-150, MX-154, MX-257, MX-267, MX-416, MX-451, and MX-EXP (HM5) (all manufactured by Kaneka Corporation), "PARALOID" (registered trademark) EXL-2655 and EXL-2668 (both manufactured by The Dow Chemical Company), and the like may be used.

(Component [G])

Aspect 1 of the present invention preferably includes 5 to 30 parts by mass of component [G]: a dicyclopentadiene type epoxy resin per 100 parts by mass of total epoxy resin. Including the component [G] in the above range may improve the heat resistance of the cured resin without increasing the viscosity of the epoxy resin composition, and thus the epoxy resin composition may be suitably used as an epoxy resin composition for a tow prepreg.

Examples of the component [G] include HP7200L, HP7200, HP7200H, HP7200HH, and HP7200HHH (all manufactured by DIC Corporation).

Aspect 2 of the present invention will be described next. Aspect 2 of the present invention includes an epoxy resin and satisfies condition 2. That is, Aspect 2 of the present invention includes the component [D]: a core-shell type rubber particle, component [E]: a boric acid ester compound, and component [F]: a curing agent as essential components.

Aspect 2 of the present invention includes 9 to 18 parts by mass of the component [D] per 100 parts by mass of total epoxy resin (condition [a]). When the amount of the component [D] is less than 9 parts by mass per 100 parts by mass of total epoxy resin, the fracture toughness value of the cured resin is insufficient, and thus the durability of the fiber-reinforced composite material is insufficient. When the amount is more than 18 parts by mass, the elastic modulus is significantly reduced, and thus the mechanical strength of the fiber-reinforced composite material is insufficient. In addition, because the viscosity of the epoxy resin composition increases, it is difficult to use the epoxy resin composition in a tow prepreg which requires a low-viscosity epoxy resin composition from the viewpoint of production process. As a commercially available product of the component [D], the core-shell type rubber particles listed in the description of Aspect 1 described above may be used.

(Component [E])

The component [E] in Aspect 2 of the present invention is a boric acid ester compound.

Specific examples of the component [E] include alkyl boric acid esters such as trimethyl borate, triethyl borate, tributyl borate, tri-n-octyl borate, tri(triethylene glycol methyl ether)borate ester, tricyclohexyl borate, and trimentyl borate, aromatic boric acid esters such as tri-o-cresyl borate, tri-m-cresyl borate, tri-p-cresyl borate, and triphenyl borate, tri(1,3-butanediol)biborate, tri(2-methyl-2,4-pentanediol)biborate, and trioctylene glycol diborate.

As the boric acid ester, a cyclic boric acid ester having a cyclic structure in the molecule may also be used. Examples of the cyclic boric acid ester include tris-o-phenylene bisborate, bis-o-phenylene pyroborate, bis-2,3-dimethylethylenephenylene pyroborate, and bis-2,2-dimethyltrimethylene pyroborate.

Examples of the product containing such boric acid esters include "CUREDUCT" (registered trademark) L-01B (Shikoku Chemicals Corporation), "CUREDUCT" (registered trademark) L-07N (Shikoku Chemicals Corporation) (composition containing 5 mass % of a boric acid ester compound), and "CUREDUCT" (registered trademark) L-07E (Shikoku Chemicals Corporation) (composition containing 5 mass % of a boric acid ester compound).

Aspect 2 of the present invention satisfies the following condition [b].

[b] $0.003 \leq$ (content of the component [D]/content of the component [E]) $\leq 0.05$ In the present invention, the content of the component [D]/the content of the component [E] is a mass ratio.

Simultaneously including the components [D] and [E] in the above-described range enables the cured epoxy resin composed of the epoxy resin composition to have remarkably high fracture toughness and high deformability. The above effect is not a level that may be expressed by the component [D] alone, but is an effect of improving specific fracture toughness that is expressed by including [D] and [E] at a specific blending ratio. Although the mechanism is not clear, it is presumed that including a specific amount of boric acid ester allows the bonding state between the cross-linked structure obtained by curing the epoxy resin composition and the component [D] to have the optimal state for improving the fracture toughness.

(Component [F])

The component [F] of Aspect 2 of the present invention is a curing agent. The curing agent is a component that reacts with the epoxy resin at a predetermined temperature to form a cross-linked structure, and is not particularly limited.

Specific examples of the component [F] include amine-based compounds such as diaminodiphenylmethane, diaminodiphenylsulfone, diethyltoluenediamine, aliphatic amines, imidazole compounds, and dicyandiamide, hydrogenated methylnadic anhydrides, and methylhexahydrophthalic anhydrides.

As the component [F], an imidazole compound is preferably used, which can enhance the heat resistance of the epoxy resin composition. As a commercially available product of such an imidazole compound, "CUREDUCT" (registered trademark) P-0505 (manufactured by Shikoku Chemicals Corporation) may be used.

In addition, dicyandiamide (component [C]) is particularly preferably used as the component [F], and excellent in imparting high dynamic characteristics and heat resistance to the cured resin.

Aspect 2 of the present invention preferably includes the component [C] and the component [H]: a curing accelerator, as in Aspect 1. As a commercially available product of the component [H], the curing accelerators listed in the description of Aspect 1 may be used. As the component [H], TBDMU is suitably used to further increase the heat resistance and the tensile elongation at break of the cured epoxy resin.

In Aspect 2 of the present invention, when an imidazole compound is used as the component [F], or when the component [H] is used, the storage stability of the intermediate base material specifically improves. Although the mechanism of improving the stability is not clear, it is presumed that because the component [E] has Lewis acidity, the imidazole compound or the amine compound liberated from the component [H] interacts with the component [E] to reduce the reactivity at room temperature.

The storage stability of the intermediate base material can be evaluated by using, as an index, a difference in glass transition temperature after the epoxy resin composition is stored under certain conditions. Regarding the storage stability of the epoxy resin composition according to Aspect 2 of the present invention, when the difference in glass transition temperature after storage at 40° C. and 75% RH for 14 days is 20° C. or less, the intermediate base material formed of the epoxy resin composition exhibits excellent storage stability even at normal temperature, which is preferable.

The storage stability of the epoxy resin composition according to Aspect 2 of the present invention can be evaluated by tracking the difference in glass transition temperature by differential scanning calorimetry (DSC). Specifically, the difference in glass transition temperature can be measured and determined by storing the epoxy resin composition for a predetermined period in a thermo-hygrostat chamber or the like, and measuring a difference in glass transition temperature between before and after the storage by measuring the temperature rise in DSC.

Aspect 2 of the present invention preferably includes the component [A] in an amount of 3 to 20 parts by mass, further preferably 6 to 10 parts by mass per 100 parts by mass of total epoxy resin. Satisfying the above-described range can effectively decrease the viscosity of the epoxy resin composition without impairing the heat resistance of the cured epoxy resin. Therefore, the epoxy resin composition is particularly preferably used when applied to a tow prepreg requiring a low-viscosity epoxy resin composition in the production process.

Aspect 2 of the present invention preferably includes the component [G]: a dicyclopentadiene type epoxy resin in an amount of 5 to 30 parts by mass per 100 parts by mass of total epoxy resin. Including the component [G] in the above-described range can improve the heat resistance of the cured resin without increasing the viscosity of the epoxy resin composition. Therefore, the epoxy resin composition can be suitably used as an epoxy resin composition for a tow prepreg.

In the present invention, an epoxy resin different from the components [A] and [G] may be used as component [I].

Examples of the epoxy resin include aniline type epoxy resins, diaminodiphenylmethane type epoxy resins, diaminodiphenylsulfone type epoxy resins, bisphenol A type epoxy resins, bisphenol F type epoxy resins, phenol novolak type epoxy resins, and xylenediamine type epoxy resins. They may be used alone, or two or more resins may be used in combination.

Examples of commercially available products of the aniline type epoxy resins include GAN (N,N-diglycidyi aniline) and GOT (N,N-diglycidyl-o-toluidine) (both manufactured by Nippon Kayaku Co., Ltd.).

Examples of commercially available products of the diaminodiphenylmethane type epoxy resins include "SUMI-EPDXY" (registered trademark) ELM434 and ELM434VL (both manufactured by Sumitomo Chemical Co., Ltd.), YH434L (manufactured by Nippon Steel & Sumikin Chemical Co., Ltd.), "jER" (registered trademark) 604 (manufactured by Mitsubishi Chemical Corporation), and "ARALDITE" (registered trademark) MY720 and MY721 (both manufactured by Huntsman Advanced Materials).

Examples of commercially available products of the diaminodiphenyl sulfone type epoxy include TG3DAS (manufactured by Konishi Chemical Inc. Co., Ltd.).

Examples of commercially available products of the bisphenol A type epoxy resins include "jER" (registered trademark) 828, 1001, and 1007 (all manufactured by Mitsubishi Chemical Corporation).

Examples of commercially available products of the bisphenol F type epoxy resins include "EPICLON" (registered trademark) 830 and 807 (both manufactured by DIC Corporation), "jER" (registered trademark) 806 and 4007P (both manufactured by Mitsubishi Chemical Corporation), and "Epotohto" (registered trademark) YDF-2001 (manufactured by Tohto Kasei Co., Ltd.).

Examples of commercially available products of the phenol novolac type epoxy resins include "jER" (registered trademark) 152, 154, and 180S (all manufactured by Mitsubishi Chemical Corporation).

Examples of commercially available products of the xylenediamine type epoxy resins include TETRAD-X (manufactured by Mitsubishi Gas Chemical Company, Inc.).

An antifoam may be added to the epoxy resin composition of the present invention as long as the effect of the present invention does not get lost. Examples of the antifoam include non-silicon polymer antifoams and silicon antifoams.

As the non-silicon polymer antifoam, "BYK" (registered trademark) 1788, 1790, 1791, and A535 (all manufactured by BYK Japan KK), and the like may be used.

As the silicon-based antifoam, "BYK" (registered trademark) 1798 and 1799 (both manufactured by BYK Japan KK), DOWSIL SH200 (manufactured by Dow Toray Co. Ltd.), and the like may be used.

For the preparation of the epoxy resin composition of the present invention, for example kneading may be performed using a machine such as a kneader, a planetary mixer, a triple roll mill, and a twin-screw extruder, or mixing may be performed by hand using a beaker, a spatula, and the like as long as uniform kneading is possible.

The epoxy resin composition of the present invention can be used as an intermediate base material obtained by composite integration with a reinforcing fiber. Examples of the form of the intermediate base material include prepreg, slit tape, and tow prepreg. These intermediate base materials are obtained by impregnating a reinforcing fiber with the epoxy resin composition. Examples thereof include a prepreg obtained by arranging a reinforcing fiber in a sheet form and impregnating the reinforcing fiber with a matrix resin, a slit tape obtained by cutting a prepreg to have a narrow width, and a tow prepreg obtained by impregnating a reinforcing fiber composed of 1,000 to 70,000 filaments with a matrix resin. The production method and the viscosity suitable as the matrix resin vary depending on the form.

The prepreg may be obtained by impregnating a reinforcing fiber base material with the epoxy resin composition of the present invention. Examples of the impregnation method include a hot melt method (dry method). The hot melt method is a method in which a reinforcing fiber is directly impregnated with the epoxy resin composition whose viscosity has been reduced by heating, or a method in which a film obtained by coating a release paper or the like with the epoxy resin composition is prepared, and then the film is stacked from both sides or one side of a reinforcing fiber, and heated and pressed to impregnate the reinforcing fiber with a resin. Therefore, it is necessary to appropriately increase the viscosity of the epoxy resin composition so as to be suitable for the pressing step.

The epoxy resin composition of the present invention may further contain a thermoplastic resin as long as the effect of the present invention does not get lost. Containing a thermoplastic resin makes it easy to adjust the viscosity to a viscosity suitable for the aspect as a prepreg. The epoxy resin composition preferably has a viscosity in the range of 8,000 to 30,000 Pa·s at 25° C. from the viewpoint of having good handleability at room temperature, that is, at 25° C. Examples of the thermoplastic resin include polyvinyl acetal resins such as polyvinyl formal and polyvinyl butyral, polyvinyl alcohol, phenoxy resins, polyvinyl pyrrolidone, polysulfone, polyethersulfone, and triblock copolymers.

Aspect 2 of the present invention preferably includes a triblock copolymer in an amount of 2 to 10 parts by mass, particularly preferably 4 to 8 parts by mass per 100 parts by mass of total epoxy resin composition. Including a triblock copolymer in such ranges enables preparation of an epoxy resin composition having a viscosity suitable for producing a prepreg while enhancing the fracture toughness of the cured epoxy resin formed of the epoxy resin composition.

As the triblock copolymer, "Nanostrength" (registered trademark) M22N, M52N, and M65N (all manufactured by Arkema K.K.), and the like may be used.

In Aspect 2, the epoxy resin composition including the triblock copolymer preferably includes the component [G]: a dicyclopentadiene type epoxy resin in an amount of 40 to 70 parts by mass, particularly preferably 45 to 65 parts by mass per 100 parts by mass of total epoxy resin. Including the component [G] in such ranges enables the epoxy resin composition to effectively increase the viscosity at 25° C. while improving the heat resistance. Therefore, the prepreg obtained by impregnating a reinforcing fiber with the epoxy resin composition is excellent in handleability at room temperature.

The above-described tow prepreg can be produced by various known methods. Examples of the methods include a method of impregnating a reinforcing fiber with the epoxy resin composition of the present invention while immersing the reinforcing fiber in the epoxy resin composition at a temperature of about normal temperature to 40° C. without using an organic solvent, and a method of forming a coating film of the epoxy resin composition on a rotating roll or release paper, then transferring the epoxy resin composition to one side or both sides of a reinforcing fiber, and then passing the coating film through a bending roll or a pressure roll to pressurize and impregnate the reinforcing fiber.

The intermediate base material of the present invention includes a reinforcing fiber impregnated with the epoxy resin composition of the present invention. The form of the intermediate base material may take the above-described various forms, and is not particularly limited. When the form of the intermediate base material is a tow prepreg, the viscosity of the epoxy resin composition to be impregnated into a reinforcing fiber is preferably 0.5 to 100 Pa·s at 25° C. When the viscosity is in this range, the impregnation property of the epoxy resin composition into the reinforcing fiber tends to be high. The viscosity of the epoxy resin composition at 25° C. is particularly preferably 3 to 30 Pa·s. When the viscosity is in this range, the impregnation property into the reinforcing fiber further improves, and thus installation of a special heating mechanism in the resin bath and dilution treatment with an organic solvent are unnecessary.

Here, the viscosity of the epoxy resin composition of the present invention may be measured by, for example, a cone and plate rotational viscometer (E-type viscometer). The viscosity may be evaluated by disposing the epoxy resin composition in an E-type viscometer set at 25° C., as an average value of the viscosities observed at a certain rotational speed.

The reinforcing fiber used in the present invention is not particularly limited, and glass fibers, carbon fibers, aramid fibers, boron fibers, alumina fibers, silicon carbide fibers, and the like may be used. Two or more of these fibers may be mixed and used. From the viewpoint of obtaining a lightweight and highly rigid fiber-reinforced composite material, carbon fibers are preferably used.

The fiber-reinforced composite material according to embodiments of the present invention includes a cured product of the intermediate base material according to embodiments of the present invention. The fiber-reinforced composite material of the present invention may be obtained, for example, by thermally curing an intermediate base material or a tow prepreg in which the epoxy resin composition prepared by the above method and a reinforcing fiber are compositely integrated.

The fiber-reinforced composite material of the present invention may also be obtained by winding a tow prepreg around a mandrel, a liner, or the like and heating and curing the tow prepreg. In manufacturing a fiber-reinforced composite material using a liner, the fiber-reinforced composite material is formed of a liner, a cured epoxy resin covering the liner, and a reinforcing fiber. The epoxy resin composition of the present invention is suitably used for general industrial applications such as pressure vessels requiring long-term durability, utilizing the characteristics of excellent deformability and fracture toughness.

The fiber-reinforced composite material of the present invention may also be obtained by appropriately using a method of laminating and molding a prepreg and applying heat and pressure thereto, such as autoclave molding method, press molding method, bagging molding method, and wrapping molding method. The obtained fiber-reinforced composite material may be preferably used for structural materials of automobiles, bicycles, ships, railway vehicles, and the like utilizing the characteristics of being excellent in deformability and fracture toughness.

EXAMPLES

Hereinafter, the present invention will be described more specifically with reference to Examples. The present invention is not limited to the description of these Examples.

The constituent elements used in Examples are as follows.
<Materials Used>
Component [A]: A Bifunctional Aliphatic Epoxy Resin
  Component [A]-1 "DENACOL" (registered trademark) EX-212,
  Component [A]-2 "DENACOL" (registered trademark) EX-911,
  Component [A]-3 "DENACOL" (registered trademark) EX-920,
  Component [A]-4 "DENACOL" (registered trademark) EX-821 (all manufactured by Nagase ChemteX Corporation),
  Component [A]-5 "ADEKA GLYCIROL" (registered trademark) ED-506 (manufactured by ADEKA Corporation).
Component [B]: A Terminal Carboxy-Modified Acrylic rubber
  Component [B]-1 "Hypro" (registered trademark) 1300X8,
  Component [B]-2 "Hypro" (registered trademark) 1300X13 (both manufactured by CVC Thermoset Specialties).
Component [C]: Dicyandiamide
  DICY7T (manufactured by Mitsubishi Chemical Corporation).
Component [D]: A Mixture of a Core-Shell Type Rubber particle and component [I] other epoxy resin
  Component [D]-1 "KaneAce" (registered trademark) MX-125 (75 mass % of bisphenol A type epoxy resin and 25 mass % of butadiene-based core-shell type rubber particle),
  Component [D]-2 "KaneAce" (registered trademark) MX-257 (63 mass % of bisphenol A type epoxy resin and 37 mass % of butadiene-based core-shell type rubber particle),
  Component [D]-3 "KaneAce" (registered trademark) MX-267 (63 mass % of bisphenol F type epoxy resin and 37 mass % of butadiene-based core-shell type rubber particle) (all manufactured by Kaneka Corporation),
  Component [D]-4 "KaneAce" (registered trademark) MX-EXP (HM5) (70 mass % of bisphenol A type epoxy resin and 30 mass % of core-shell type rubber particle) (both manufactured by Kaneka Corporation),
  Component [D]-5 "PARALOID" (registered trademark) EXL-2655 (MBS core-shell type rubber particle: 100 mass %) (manufactured by The Dow Chemical Company).
Component [E]: A Mixture of a Boric Acid Ester compound, component [I] other epoxy resin, and a phenol novolak resin
  Component [E]-1 "CUREDUCT" (registered trademark) L-07E (5 mass % of boric acid ester compound, 5 mass % of phenol novolac resin, and 90 mass % bisphenol A type epoxy resin),
  Component [E]-2 "CUREDUCT" (registered trademark) L-01B (5 mass % of boric acid ester compound, 5 mass % of phenol novolac resin, and 90 mass of bisphenol A type epoxy resin) (all manufactured by Shikoku Chemicals Corporation).
Component [F]: A Curing Agent
  "CUREDUCT" (registered trademark) P-0505 (manufactured by Shikoku Chemicals Corporation).
Component [G]: A Dicyclopentadiene Type Epoxy Resin
  Component [G]-1 "EPICLON" (registered trademark) HP7200L,
  Component [G]-2 "EPICLON" (registered trademark) HP7200,
  Component [G]-3 "EPICLON" (registered trademark) HP7200HHH (all manufactured by DIC Corporation).
Component [H]: A Curing Accelerator
  Component [H]-1 DCMU99 (manufactured by Hodogaya Chemical Co., Ltd.),
  Component [H]-2 "Omicure" (registered trademark) 24,
  Component [H]-3 "Omicure" (registered trademark) 94 (both manufactured by PTI Japan Ltd.).

Component [I]: Other Epoxy Resin
Component [I]-1 "jER" (registered trademark) 828,
Component [I]-2 "jER" (registered trademark) 1001,
Component [I]-3 "jER" (registered trademark) 806,
Component [I]-4 "jER" (registered trademark) 154 (all manufactured by Mitsubishi Chemical Corporation),
Component [I]-5 "EPICLON" (registered trademark) 830 (manufactured by DIC Corporation),
Component [I]-6 "Epotohto" (registered trademark) YDF-2001 (manufactured by Tohto Kasei Co., Ltd.),
Component [I]-7 TETRAD-X (manufactured by MITSUBISHI GAS CHEMICAL COMPANY, INC.),
Component [I]-8 "ARALDITE" (registered trademark) CY-184 (manufactured by Huntsman Advanced Materials LLC),
Component [I]-9 "DENACOL" (registered trademark) EX-201 (manufactured by Nagase ChemteX Corporation).

Thermoplastic Resin

YP-50 (manufactured by Tohto Kasei Co., Ltd.), "SUMIKAEXCEL" PES5003P (manufactured by Sumitomo Chemical Co., Ltd.), "VINYLEC" (registered trademark) K (manufactured by JNC Corporation), "Nanostrength" (registered trademark) M22N and M52N (both manufactured by Arkema K.K.).

Other Additives

"BYK" (registered trademark) 1788, 1790, and A506 (all manufactured by BYK Japan KK), DOWSIL SH200 (manufactured by Dow Toray Co., Ltd.), XER-91 (manufactured by JSR Corporation).

<Method for Preparing Epoxy Resin Composition>

In a stainless steel beaker, predetermined amounts of the components other than the component [D] a core-shell type rubber particle, the component [E] a boric acid ester compound, the component [H] a curing accelerator, the component [C] dicyandiamide, and the component [F] a curing agent were put, heated to 60 to 150° C., and appropriately kneaded until the components were compatible with each other. After the temperature was lowered to 60° C., the component [E] and/or the component [D] were added and kneaded for 10 minutes, and then the component [F], or the component [C] and the component [H] were added and kneaded at 60° C. for 30 minutes to obtain an epoxy resin composition. The compositions of the epoxy resins are as shown in Tables 1 to 7.

<Method for Evaluating Tensile Properties of Cured Epoxy Resin>

The uncured epoxy resin composition obtained according to the <Method for Preparing Epoxy Resin Composition> was defoamed in vacuum, and then cured at a temperature of 150° C. for 1 hour in a mold set to have a thickness of 2 mm with a 2 mm thick "Teflon" (registered trademark) spacer, whereby a cured resin plate having a thickness of 2 mm was obtained. The obtained cured resin plate was processed into a 1BA dumbbell shape in accordance with JIS K7161 (1994). Using an instron universal tester (manufactured by stron), a distance between chucks was set to 58 mm, a resin tensile test was performed at a test speed of 1 mm/min, and the tensile elastic modulus, tensile strength, and tensile elongation at break were measured. The average value of the values measured with the number of samples n=8 was adopted.

<Method for Evaluating Gelation Start Time of Epoxy Resin Composition>

The uncured epoxy resin composition obtained according to the <Method for Preparing Epoxy Resin Composition> was allowed to stand in an amount of 2 mL on a micropress heated to 150° C. in advance, and the ion viscosity was measured by Cure Monitor LT-451 (manufactured by Lambient Technologies LLC.). The ion viscosity of the epoxy resin composition takes a minimum value at the start of curing, increases as the curing reaction proceeds, and then saturates as the curing reaction is completed. In the present invention, the cure index (Cd) was calculated from the measured value of the ion viscosity under the condition of 150° C. and 1 hour according to ASTM E2039 standard, and the time taken until Cd reaches 20% was adopted as the gelation start time.

<Method for Evaluating Fracture Toughness Value of Cured Epoxy Resin>

The uncured epoxy resin composition obtained according to the <Method for Preparing Epoxy Resin Composition> was defoamed in vacuum, and then cured at a temperature of 150° C. for 1 hour in a mold set to a thickness of 6 mm with a 6 mm thick "Teflon" (registered trademark) spacer, whereby a cured resin plate having a thickness of 6 mm was obtained. The obtained cured resin plate was processed into a test piece shape described in ASTM D5045-99, and then subjected to a SENB test according to ASTM D5045-99. The number of samples was n=16, and the average value thereof was adopted as the K1c value.

<Measurement of Glass Transition Temperature>

Small pieces (5 to 10 mg) were collected from the cured resin plate obtained in the <Method for Evaluating Tensile Properties of Cured Epoxy Resin>, and the intermediate point glass transition temperature was measured according to JIS K7121 (1987). The measurement was performed using a differential scanning calorimeter DSC Q2000 (manufactured by TA Instruments) at a temperature rising rate of 20° C./min under a nitrogen gas atmosphere. The number of samples was n=2, and the average value thereof was taken as the glass transition temperature.

<Viscosity Measurement of Epoxy Resin Composition at 25° C.>

The viscosity of the epoxy resin composition obtained according to the <Method for Preparing Epoxy Resin Composition> was measured using an E-type viscometer (TVE-22HT manufactured by Toki Sangyo Co., Ltd.) equipped with a standard cone rotor (1° 34'×R24) at 25° C. according to "Method for Measuring Viscosity by Cone and Plate Rotational Viscometer" in JIS 28803 (2011), and the average value of the viscosity measured 5 times at a rotation speed of 5 revolutions/min was adopted.

<Method for Evaluating Storage Stability of Epoxy Resin Composition>

The epoxy resin composition obtained according to the <Method for Preparing Epoxy Resin Composition> in an amount of 3 g was weighed in an aluminum cup. The amount of difference in glass transition temperature was defined as $\Delta Tg = Ta - Tb$, wherein Ta is the glass transition temperature after the composition was allowed to stand in a thermohygrostat chamber for 14 days in an environment of 40° C. and 75% RE, and Tb is the initial glass transition temperature. The storage stability was determined by the value of $\Delta Tg$. The glass transition temperature was measured by weighing 3 mg of the epoxy resin after storage into a sample pan, raising the temperature from −20° C. to 150° C. at 5° C./min using a differential scanning calorimeter (Q-2000: manufactured by TA Instruments). The midpoint of the inflection point of the obtained heat generation curve was acquired as the glass transition temperature.

Example 1

An epoxy resin composition was prepared according to the <Method for Preparing Epoxy Resin Composition> using 2 parts by mass of "DENACOL" (registered trademark) EX-911, 90 parts by mass of "jER" (registered trademark) 828, and 8 parts by mass of "jER" (registered trademark) 1001 as epoxy resins, 15 parts by mass of "Hypro" (registered trademark) 1300X8 as a terminal carboxy-modified acrylic rubber, 7.3 parts by mass of DICY7T as dicyandiamide, and 2.5 parts by mass of DCMU99 as an aromatic urea compound.

For this epoxy resin composition, the tensile properties were obtained according to the <Method for Evaluating Tensile Properties of Cured Epoxy Resin>. The epoxy resin composition exhibited high deformability with a tensile elastic modulus of 2.9 GPa, a tensile strength of 65 MPa, and a tensile elongation at break of 7.5%. The fracture toughness value was evaluated according to the <Method for Evaluating Fracture Toughness Value of Cured Epoxy Resin>. The composition showed an excellent fracture toughness of 2.0 MPa·m$^{0.5}$. The heat resistance was evaluated according to the <Measurement of Glass Transition Temperature>. The composition showed a good glass transition temperature of 136° C.

The viscosity of the epoxy resin composition was measured according to the <Viscosity Measurement of Epoxy Resin Composition at 25° C.> and was 28 Pa·s, which was an appropriate viscosity in producing a tow prepreg.

The time taken until the cure index (Cd) of the epoxy resin composition reaches 20% was measured according to the <Method for Evaluating Gelation Start Time of Epoxy Resin Composition>. The time was 4.1 minutes.

Examples 2 to 19

Epoxy resin compositions and cured resins were produced in the same manner as in Example 1 except that the composition of resin was changed as shown in Tables 1 to 3.

As a result of evaluating the tensile properties, the fracture toughness value, and the heat resistance of each epoxy resin composition of the examples, good physical properties were obtained at all levels. The viscosity of each epoxy resin composition of the examples at 25° C. was measured. The results were 10 to 25 Pa·s. Each composition showed a good viscosity. The time taken until Cd reaches 20% was measured for each epoxy resin composition of the examples. The results were 1.6 to 4.4 minutes. Each composition showed an appropriate gelation start time for heat-molding a fiber-reinforced composite material.

Examples 20 to 28, 31, and 32

Epoxy resin compositions and cured resins were produced in the same manner as in Example 1 except that the composition of resin was changed as shown in Tables 3 and 4.

As a result of evaluating the tensile properties, the fracture toughness value, and the heat resistance of each epoxy resin composition of the examples, good physical properties were obtained at all levels. The viscosity of each epoxy resin composition of the examples at 25° C. was measured. The results were 12 to 20 Pa·s. Each composition showed a viscosity suitable for producing a tow prepreg. The storage stability was evaluated according to the <Method for Evaluating Storage Stability of Epoxy Resin Composition>, and the results showed a ΔTg in the range of 1 to 22° C.

Examples 29, 30, and 33 to 37

Epoxy resin compositions and cured resins were produced in the same manner as in Example 1 except that the composition of resin was changed as shown in Tables 4 and 5 and a thermoplastic resin was added.

As a result of evaluating the tensile properties, the fracture toughness value, the storage stability, and the heat resistance of each epoxy resin composition of the examples, good physical properties were obtained at all levels. The viscosity of each epoxy resin composition of the examples at 25° C. was measured. The results were 8,800 to 12,000 Pa·s. Each composition showed a viscosity suitable for producing a prepreg.

Comparative Example 1

For the resin composition shown in Table 6, an epoxy resin composition was produced by the method described in Example 4 of Patent Document 1 (WO 2017/099060 A).

The glass transition temperature of the epoxy resin composition was measured according to the <Measurement of Glass Transition Temperature>. The temperature was 138° C. The viscosity was measured according to the <Measurement of Viscosity of Epoxy Resin Composition at 25° C.>. The viscosity was 29 Pa·s. The time taken until Cd reaches 20% was measured according to the <Method for Evaluating Gelation Start Time of Epoxy Resin Composition>. The time was 6.7 minutes, which was insufficient. The storage stability was evaluated according to <Method for Evaluating Storage Stability of Epoxy Resin Composition>. The result showed a ΔTg of 32° C., which was insufficient.

The fracture toughness value of this epoxy resin composition was evaluated according to the <Method for Evaluating Fracture Toughness Value of Cured Epoxy Resin>. The value was as low as 1.7 MPa·m$^{0.5}$, because the epoxy resin composition does not include the components [A] and [B].

As a result of obtaining the tensile properties according to the <Method for Evaluating Tensile Properties of Cured Epoxy Resin>, the tensile elongation at break was 8.0%, but the tensile elastic modulus was as remarkably low as 1.9 GPa probably because the epoxy resin composition includes a large amount of the component [D] (including 22.7 parts by mass of [D] per 100 parts by mass of total epoxy resin).

Comparative Example 2

For the resin composition shown in Table 6, an epoxy resin composition was produced by the method described in Example 5 of Patent Document 2 (Japanese Patent Laid-open Publication No. 9-227693), and the viscosity at 25° C., the time taken until Cd reaches 20% at 150° C., the tensile properties, the fracture toughness, and the heat resistance were evaluated in the same manner as in Comparative Example 1.

The tensile elongation at break and the fracture toughness value were insufficient because the epoxy resin composition does not include the component [A], the component [B], and the component [D]. The viscosity at 25° C. was 72 Pa·s. The time taken until Cd reaches 20% was 4.8 minutes. In addition, ΔTg was 27° C., which was insufficient.

Comparative Example 3

For the resin composition shown in Table 6, an epoxy resin composition was produced by the method described in Example 1 of Patent Document 3 (Japanese Patent Application Laid-Open No. 2011-157491), and the viscosity at 25° C., the time taken until Cd reaches 20% at 150° C., the tensile properties, the fracture toughness, and the heat resistance were evaluated in the same manner as in Comparative Example 1.

The cured resin formed of the epoxy resin composition had insufficient tensile properties, fracture toughness, and heat resistance.

Comparative Example 4

For the resin composition shown in Table 6, an epoxy resin composition was produced in the same manner as in Example 1, and the viscosity at 25° C., the time taken until Cd reaches 20% at 150° C., the tensile properties, the fracture toughness, and the heat resistance were evaluated in the same manner as in Comparative Example 1.

The fracture toughness was as high as 2.0 MPa·m$^{0.5}$ because the composition included 15 parts by mass of the component [B], but the tensile elongation at break was as insufficient as 5.1% because the epoxy resin composition does not include the component [A]. The viscosity at 25° C. was 60 Pa·s.

Comparative Example 5

For the resin composition shown in Table 6, an epoxy resin composition was produced in the same manner as in Example 1, and the viscosity at 25° C., the time taken until Cd reaches 20% at 150° C., the tensile properties, the fracture toughness, and the heat resistance were evaluated in the same manner as in Comparative Example 1.

The tensile elongation at break and the fracture toughness were significantly low because the epoxy resin composition includes the component [A] but not the component [B].

Comparative Example 6

For the resin composition shown in Table 6, an epoxy resin composition was produced in the same manner as in Example 1, and the viscosity at 25° C., the time taken until Cd reaches 20% at 150° C., the tensile properties, the fracture toughness, and the heat resistance were evaluated in the same manner as in Comparative Example 1.

The tensile elongation at break was particularly insufficient because the epoxy resin composition includes the components [A] and [D] but not the component [B].

Comparative Example 7

For the resin composition shown in Table 6, an epoxy resin composition was produced in the same manner as in Example 1, and the viscosity at 25° C., the time taken until Cd reaches 20% at 150° C., the tensile properties, the fracture toughness, and the heat resistance were evaluated in the same manner as in Comparative Example 1.

The resin composition includes the components [A] and [D], and includes YP-50 as a thermoplastic resin instead of including the component [B]. The epoxy resin composition had a remarkably low tensile elongation at break. The viscosity at 25° C. was 103 Pa·s, which was not suitable for producing a tow prepreg.

Comparative Example 8

For the resin composition shown in Table 6, an epoxy resin composition was produced in the same manner as in Example 1, and the viscosity at 25° C., the time taken until Cd reaches 20% at 150° C., the tensile properties, the fracture toughness, and the heat resistance were evaluated in the same manner as in Comparative Example 1.

The epoxy resin composition includes the component [A] but does not include the component [B]. The epoxy resin composition contains YP-50 and "SUMIKAEXCEL" PES5003P as thermoplastic resins instead of including the component [D]. However, the fracture toughness and the tensile elongation at break of the cured product formed of the epoxy resin composition were significantly low.

Comparative Example 9

For the resin composition shown in Table 7, an epoxy resin composition was produced by the method described in Example 4 of Patent Document 2 (Japanese Patent Laid-open Publication No. 9-157498), and the viscosity at 25° C., the storage stability, tensile properties, the fracture toughness, and the heat resistance were evaluated in the same manner as in Comparative Example 1.

The fracture toughness value was insufficient probably because the epoxy resin composition includes only 7 parts by mass of the component [D] per 100 parts by mass of total epoxy resin. The tensile elongation at break was as extremely low as 4.0%.

Although the storage stability was good as having a ΔTg of 5° C., the viscosity at 25° C. was 800 Pa·s, which was an unsuitable viscosity in producing a tow prepreg and a prepreg.

Comparative Example 10

For the resin compositions shown in Table 7, an epoxy resin composition was produced in the same manner as in Example 1, and the viscosity at 25° C., the storage stability, tensile properties, the fracture toughness, and the heat resistance were evaluated in the same manner as in Comparative Example 1.

The epoxy resin composition includes 10 parts by mass of the component [D], but includes 0.01 parts by mass of the component [E] (0.2 parts by mass of L-07E), which is a small amount. The mass ratio of the content of the component [E]/the content of the component [D] was 0.001, and the fracture toughness was 1.6 MPa·m$^{0.5}$, which was insufficient. The composition had a ΔTg of 32° C., indicating insufficient stability. The viscosity at 25° C. was 22 Pa·s.

Comparative Example 11

For the resin compositions shown in Table 7, an epoxy resin composition was produced in the same manner as in Example 1, and the viscosity at 25° C., the storage stability, tensile properties, the fracture toughness, and the heat resistance were evaluated in the same manner as in Comparative Example 1.

The epoxy resin composition includes 10 parts by mass of the component [D] and 0.65 parts by mass of the component [E] (13 parts by mass of L-07E). The mass ratio of the content of the component [E]/the content of the component [D] was 0.065, and the fracture toughness value was as low as 1.5 MPa·m$^{0.5}$.

TABLE 1-1

| Raw material of epoxy resin composition | | | Example 1 | Example 2 | Example 3 | Example 4 |
|---|---|---|---|---|---|---|
| [A] Bifunctional aliphatic epoxy resin (Formula (I)) | "DENACOL ®"EX-212 | $R^1$ = H, m = 6, n = 1 | | | | |
| | "DENACOL ®"EX-911 | $R^1$ = $CH_3$, m = 2, n = 2 | 2 | 22 | | 12 |
| | "DENACOL ®"EX-920 | $R^1$ = $CH_3$, m = 2, n = 3 | | | 12 | |
| | "DENACOL ®"EX-821 | $R^1$ = H, m = 2, n = 4 | | | | |
| [G] Dicyclopentadiene type epoxy resin | "EPICLON ®"HP7200L | a dicyclopentadiene type epoxy resin | | | | |
| [I] Other epoxy resin | "jER ®"828 | Biphenol A type epoxy resin | 90 | 70 | 80 | 80 |
| | "jER ®"1001 | | 8 | 8 | | |
| | "jER ®"154 | Phenol novolac type epoxy resin | | | 8 | 8 |
| | "EPICLON ®"830 | Bisphenol F type epoxy resin | | | | |
| [B] Terminal carboxy-modified acrylic rubber | "Hypro ®"1300x8 | | 15 | 15 | 15 | |
| | "Hypro ®"1300x13 | | | | | 15 |
| Mixture of core-shell type rubber particles and epoxy resin | "KaneAce ®"MX-125 Masterbatch containing 25 mass % of core-shell rubber particles | [D] Core-shell type rubber particle Bisphenol A type epoxy resin (component [I]) | | | | |
| [C] Dicyandiamide | DICY7T | dicyandiamide | 7.3 | 7.4 | 7.3 | 8.0 |
| [H] Curing accelerator | DCMU99 | DCMU | 2.5 | 2.4 | 2.4 | 2.6 |
| Content of component [B]/content of component [D] (mass ratio) | | | — | — | — | — |
| Viscosity of epoxy resin composition at 25° C. (Pa · s) | | | 28 | 10 | 12 | 13 |
| Time taken until Cd reaches 20% (when cured at 150° C., minutes) | | | 4.1 | 4.3 | 4.3 | 4.1 |
| Properties of cured resin | Tensile elastic modulus (GPa) | | 2.9 | 3.2 | 3.0 | 3.1 |
| | Tensile strength (MPa) | | 65 | 57 | 57 | 59 |
| | Tensile elongation at break (%) | | 7.5 | 7.7 | 8.0 | 8.1 |
| | Resin toughness K1c (MPa · $m^{0.5}$) | | 2.0 | 2.1 | 2.1 | 2.0 |
| | Glass transition temperature (° C.) | | 136 | 120 | 133 | 132 |

TABLE 1-2

| Raw material of epoxy resin composition | | | Example 5 | Example 6 | Example 7 | Example 8 |
|---|---|---|---|---|---|---|
| [A] Bifunctional aliphatic epoxy resin (Formula (I)) | "DENACOL ®"EX-212 | $R^1$ = H, m = 6, n = 1 | | | | 12 |
| | "DENACOL ®"EX-911 | $R^1$ = $CH_3$, m = 2, n = 2 | | | | |
| | "DENACOL ®"EX-920 | $R^1$ = $CH_3$, m = 2, n = 3 | | | 12 | |
| | "DENACOL ®"EX-821 | $R^1$ = H, m = 2, n = 4 | 12 | 12 | | |
| [G] Dicyclopentadiene type epoxy resin | "EPICLON ®"HP7200L | a dicyclopentadiene type epoxy resin | | | | 20 |
| [I] Other epoxy resin | "jER ®"828 | Biphenol A type epoxy resin | 37 | 61 | 50 | 60 |
| | "jER ®"1001 | | | | | |
| | "jER ®"154 | Phenol novolac type epoxy resin | | | | 8 |
| | "EPICLON ®"830 | Bisphenol F type epoxy resin | | | 8 | |
| [B] Terminal carboxy-modified acrylic rubber | "Hypro ®"1300x8 | | 4 | 7 | 4 | |
| | "Hypro ®"1300x13 | | | | | 15 |
| Mixture of core-shell type rubber particles and epoxy resin | "KaneAce ®"MX-125 Masterbatch containing 25 mass % of core-shell rubber particles | [D] Core-shell type rubber particle Bisphenol A type epoxy resin (component [I]) | 17 / 51 | 9 / 27 | 10 / 30 | |
| [C] Dicyandiamide | DICY7T | dicyandiamide | 7.4 | 7.5 | 7.7 | 7.6 |
| [H] Curing accelerator | DCMU99 | DCMU | 2.7 | 2.7 | 2.7 | 2.8 |
| Content of component [B]/content of component [D] (mass ratio) | | | 0.24 | 0.78 | 0.40 | — |
| Viscosity of epoxy resin composition at 25° C. (Pa · s) | | | 20 | 16 | 15 | 24 |
| Time taken until Cd reaches 20% (when cured at 150° C., minutes) | | | 4.2 | 4.4 | 4.2 | 4.0 |
| Properties of cured resin | Tensile elastic modulus (GPa) | | 2.7 | 2.8 | 2.7 | 2.6 |
| | Tensile strength (MPa) | | 59 | 61 | 62 | 58 |
| | Tensile elongation at break (%) | | 12.0 | 9.5 | 13.0 | 9.0 |
| | Resin toughness K1c (MPa · $m^{0.5}$) | | 2.1 | 2.4 | 2.3 | 2 |
| | Glass transition temperature (° C.) | | 131 | 132 | 133 | 140 |

TABLE 2-1

| Raw material of epoxy resin composition | | | Example 9 | Example 10 | Example 11 | Example 12 |
|---|---|---|---|---|---|---|
| [A] Bifunctional aliphatic epoxy resin (Formula (I)) | "DENACOL ®"EX-212 | $R^1$ = H, m = 6, n = 1 | | | | |
| | "DENACOL ®"EX-911 | $R^1$ = CH$_3$, m = 2, n = 2 | | | 6 | |
| | "DENACOL ®"EX-920 | $R^1$ = CH$_3$, m = 2, n = 3 | 12 | 8 | | |
| | "DENACOL ®"EX-821 | $R^1$ = H, m = 2, n = 4 | | | | 6 |
| [G] Dicyclopentadiene type epoxy resin | "EPICLON ®"HP7200L | a dicyclopentadiene type epoxy resin | | | | 8 |
| | "EPICLON ®"HP7200 | | 15 | 10 | 7 | |
| [I] Other epoxy resin | "jER ®"828 | Biphenol A type epoxy resin | 48 | 65 | 60 | 60 |
| | "jER ®"154 | Phenol novolac type epoxy resin | 8 | | | |
| | "EPICLON ®"830 | Bisphenol F type epoxy resin | | | 10 | 9 |
| | "EPICLON ®"806 | | | | | |
| [B] Terminal carboxy-modified acrylic rubber | "Hypro ®"1300x8 | | 4 | 4 | 4 | 4 |
| | "Hypro ®"1300x13 | | | | | |
| Mixture of core-shell type rubber particles and epoxy resin | "KaneAce ®"MX-257 Masterbatch containing 37 mass % of core-shell rubber particles | [D] Core-shell type rubber particle Bisphenol A type epoxy resin (component [I]) | | | 10 | |
| | | | | | 17 | |
| | "KaneAce ®"MX-267 Masterbatch containing 37 mass % of core-shell rubber particles | [D] Core-shell type rubber particle Bisphenol F type epoxy resin (component [I]) | 10 | 10 | | 10 |
| | | | 17 | 17 | | 17 |
| [C] Dicyandiamide | DICY7T | dicyandiamide | 7.5 | 7.3 | 7.4 | 7.4 |
| [H] Curing accelerator | DCMU99 | DCMU | | 3 | | |
| | "Omicure ®"24 | TBDMU | 1.7 | | 1.6 | 1.7 |
| Other additives | "BYK ®"1790 | Non-silicon polymer antifoam | | | | |
| | "BYK ®"1788 | | | | | |
| Content of component [B]/content of component [D] (mass ratio) | | | 0.40 | 0.40 | 0.40 | 0.40 |
| Viscosity of epoxy resin composition at 25° C. (Pa · s) | | | 21 | 14 | 21 | 21 |
| Time taken until Cd reaches 20% (when cured at 150° C., minutes) | | | 3.8 | 3.7 | 3.5 | 3.3 |
| Properties of cured resin | Tensile elastic modulus (GPa) | | 2.9 | 2.8 | 2.9 | 3.0 |
| | Tensile strength (MPa) | | 55 | 54 | 63 | 64 |
| | Tensile elongation at break (%) | | 13.5 | 14.0 | 15.0 | 14.0 |
| | Resin toughness K1c (MPa · m$^{0.5}$) | | 2.2 | 2.2 | 2.4 | 2.4 |
| | Glass transition temperature (° C.) | | 142 | 140 | 140 | 138 |

TABLE 2-2

| Raw material of epoxy resin composition | | | Example 13 | Example 14 | Example 15 | Example 16 |
|---|---|---|---|---|---|---|
| [A] Bifunctional aliphatic epoxy resin (Formula (I)) | "DENACOL ®"EX-212 | $R^1$ = H, m = 6, n = 1 | | 6 | | |
| | "DENACOL ®"EX-911 | $R^1$ = CH$_3$, m = 2, n = 2 | | | | |
| | "DENACOL ®"EX-920 | $R^1$ = CH$_3$, m = 2, n = 3 | | | | 6 |
| | "DENACOL ®"EX-821 | $R^1$ = H, m = 2, n = 4 | 6 | | 6 | |
| [G] Dicyclopentadiene type epoxy resin | "EPICLON ®"HP7200L | a dicyclopentadiene type epoxy resin | 20 | 11 | 11 | 11 |
| | "EPICLON ®"HP7200 | | | | | |
| [I] Other epoxy resin | "jER ®"828 | Biphenol A type epoxy resin | 64 | 60 | 60 | 60 |
| | "jER ®"154 | Phenol novolac type epoxy resin | | | | |
| | "EPICLON ®"830 | Bisphenol F type epoxy resin | 10 | | 6 | |
| | "EPICLON ®"806 | | | 6 | | 6 |
| [B] Terminal carboxy-modified acrylic rubber | "Hypro ®"1300x8 | | 15 | | 5 | 4 |
| | "Hypro ®"1300x13 | | | 5 | | |
| Mixture of core-shell type rubber particles and epoxy resin | "KaneAce ®"MX-257 Masterbatch containing 37 mass % of core-shell rubber particles | [D] Core-shell type rubber particle Bisphenol A type epoxy resin (component [I]) | | 10 | 10 | 10 |
| | | | | 17 | 17 | 17 |
| | "KaneAce ®"MX-267 Masterbatch containing 37 mass % of core-shell rubber particles | [D] Core-shell type rubber particle Bisphenol F type epoxy resin (component [I]) | | | | |
| [C] Dicyandiamide | DICY7T | dicyandiamide | 7.3 | 5.1 | 5.1 | 6.3 |
| [H] Curing accelerator | DCMU99 | DCMU | | | | |
| | "Omicure ®"24 | TBDMU | 1.8 | 2.8 | 2.8 | 1.4 |
| Other additives | "BYK ®"1790 | Non-silicon polymer antifoam | | | | 0.9 |
| | "BYK ®"1788 | | | | 0.9 | |

TABLE 2-2-continued

| Raw material of epoxy resin composition | | Example 13 | Example 14 | Example 15 | Example 16 |
|---|---|---|---|---|---|
| Content of component [B]/content of component [D] (mass ratio) | | — | 0.50 | 0.50 | 0.40 |
| Viscosity of epoxy resin composition at 25° C. (Pa · s) | | 25 | 22 | 20 | 19 |
| Time taken until Cd reaches 20% (when cured at 150° C., minutes) | | 2.8 | 1.7 | 1.8 | 3.2 |
| Properties of cured resin | Tensile elastic modulus (GPa) | 2.6 | 2.8 | 2.8 | 2.7 |
| | Tensile strength (MPa) | 58 | 61 | 59 | 59 |
| | Tensile elongation at break (%) | 9.0 | 15.0 | 15.0 | 14.0 |
| | Resin toughness K1c (MPa · m$^{0.5}$) | 2.0 | 2.2 | 2.1 | 2.3 |
| | Glass transition temperature (° C.) | 143 | 138 | 137 | 135 |

TABLE 3-1

| Raw material of epoxy resin composition | | | Example 17 | Example 18 | Example 19 | Example 20 |
|---|---|---|---|---|---|---|
| [A] Bifunctional aliphatic epoxy resin (Formula (I)) | "DENACOL ®"EX-212 | R$^1$ = H, m = 6, n = 1 | | | | |
| | "DENACOL ®"EX-911 | R$^1$ = CH$_3$, m = 2, n = 2 | | | 5.5 | |
| | "DENACOL ®"EX-920 | R$^1$ = CH$_3$, m = 2, n = 3 | 7.3 | 4.3 | | |
| | "DENACOL ®"EX-821 | R$^1$ = H, m = 2, n = 4 | | | | |
| [G] Dicyclopentadiene type epoxy resin | "EPICLON ®"HP7200L | a dicyclopentadiene type epoxy resin | 11 | 11 | | |
| [I] Other epoxy resin | "jER ®"828 | Biphenol A type epoxy resin | 60 | 60 | 57.1 | 81.2 |
| | "jER ®"154 | Phenol novolac type epoxy resin | | | 11 | |
| | "EPICLON ®"830 | Bisphenol F type epoxy resin | | | 6 | |
| | "EPICLON ®"806 | Bisphenol F type epoxy resin | 6 | 6 | | |
| [B] Terminal carboxy-modified acrylic rubber | "Hypro ®"1300x8 | | | 7 | | |
| | "Hypro ®"1300x13 | | 4 | | 4 | |
| Mixture containing boric acid ester compound | "CUREDUCT ®"L-07E | [E] Boric acid ester compound | | | | 0.15 |
| | | Bisphenol A type epoxy resin (component [I]) | | | | 0.15 |
| | | Phenol novolac resin (other additives) | | | | 2.7 |
| Mixture of core-shell type rubber particles and epoxy resin | "KaneAce ®"MX-257 Masterbatch containing 37 mass % of core-shell rubber particles | [D] Core-shell type rubber particle | 11 | 11 | 12 | 11 |
| | | Bisphenol A type epoxy resin (component [I]) | 19 | 19 | 20 | 19 |
| [F] Curing agent | DICY7T | [C] Dicyandiamide | 6.3 | 5.1 | 5.1 | |
| | "CUREDUCT ®"P-0505 | Imidazole compound | | | | 3.0 |
| [H] Curing accelerator | DCMU99 | DCMU | | | | |
| | "Omicure ®"24 | TBDMU | 3.2 | 1.4 | 2.8 | |
| Other additives | "BYK ®"1790 | Non-silicon polymer antifoam | | 0.9 | | |
| | SH200 | Silicon antifoam | | | 0.8 | |
| Content of component [B]/content of component [D] (mass ratio) | | | 0.36 | 0.64 | 0.33 | |
| Content of component [E]/content of component [D] (mass ratio) | | | | | | 0.014 |
| Viscosity of epoxy resin composition at 25° C. (Pa · s) | | | 19 | 19 | 26 | 14 |
| Time taken until Cd reaches 20% (when cured at 150° C., minutes) | | | 1.6 | 3.1 | 1.7 | |
| Properties of cured resin | Tensile elastic modulus (GPa) | | 2.9 | 2.8 | 2.7 | 3.1 |
| | Tensile strength (MPa) | | 63 | 61 | 60 | 55 |
| | Tensile elongation at break (%) | | 15.0 | 13.0 | 13.0 | 8.0 |
| | Resin toughness K1c (MPa · m$^{0.5}$) | | 2.4 | 2.2 | 2.1 | 2.0 |
| | Glass transition temperature (° C.) | | 139 | 137 | 140 | 142 |
| Storage stability | ΔTg (° C., after 14 days) | | — | — | — | 21 |

TABLE 3-2

| Raw material of epoxy resin composition | | | Example 21 | Example 22 | Example 23 | Example 24 |
|---|---|---|---|---|---|---|
| [A] Bifunctional aliphatic epoxy resin (Formula (I)) | "DENACOL ®"EX-212 | R$^1$ = H, m = 6, n = 1 | | | | |
| | "DENACOL ®"EX-911 | R$^1$ = CH$_3$, m = 2, n = 2 | | | | |
| | "DENACOL ®"EX-920 | R$^1$ = CH$_3$, m = 2, n = 3 | | | | |
| | "DENACOL ®"EX-821 | R$^1$ = H, m = 2, n = 4 | | | | |

TABLE 3-2-continued

| Raw material of epoxy resin composition | | | Example 21 | Example 22 | Example 23 | Example 24 |
|---|---|---|---|---|---|---|
| [G] Dicyclopentadiene type epoxy resin | "EPICLON ®"HP7200L | a dicyclopentadiene type epoxy resin | | | | |
| [I] Other epoxy resin | "jER ®"828 | Biphenol A type epoxy resin | 81.3 | 81 | 83.7 | 72.6 |
| | "jER ®"154 | Phenol novolac type epoxy resin | | | | |
| | "EPICLON ®"830 | Bisphenol F type epoxy resin | | | | |
| | "EPICLON ®"806 | Bisphenol F type epoxy resin | | | | |
| [B] Terminal carboxy-modified acrylic rubber | "Hypro ®"1300x8 | | | | | |
| | "Hypro ®"1300x13 | | | | | |
| Mixture containing boric acid ester compound | "CUREDUCT ®"L-07E | [E] Boric acid ester compound | 0.05 | 0.4 | 0.15 | 0.25 |
| | | Bisphenol A type epoxy resin (component [I]) | 0.05 | 0.4 | 0.15 | 0.25 |
| | | Phenol novolac resin (other additives) | 0.9 | 7.2 | 2.7 | 4.5 |
| Mixture of core-shell type rubber particles and epoxy resin | "KaneAce ®"MX-257 Masterbatch containing 37 mass % of core-shell rubber particles | [D] Core-shell type rubber particle | 11 | 11 | 10 | 16 |
| | | Bisphenol A type epoxy resin (component [I]) | 19 | 19 | 16 | 27 |
| [F] Curing agent | DICY7T | [C] Dicyandiamide | 7.4 | 7.3 | 8.0 | 7.4 |
| | "CUREDUCT ®"P-0505 | Imidazole compound | | | | |
| [H] Curing accelerator | DCMU99 | DCMU | 2.4 | 2.4 | 2.6 | 2.7 |
| | "Omicure ®"24 | TBDMU | | | | |
| Other additives | "BYK ®"1790 | Non-silicon polymer antifoam | | | | |
| | SH200 | Silicon antifoam | | | | |
| Content of component [B]/content of component [D] (mass ratio) | | | | | | |
| Content of component [E]/content of component [D] (mass ratio) | | | 0.005 | 0.036 | 0.016 | 0.016 |
| Viscosity of epoxy resin composition at 25° C. (Pa · s) | | | 14 | 15 | 12 | 20 |
| Time taken until Cd reaches 20% (when cured at 150° C., minutes) | | | | | | |
| Properties of cured resin | Tensile elastic modulus (GPa) | | 2.7 | 2.8 | 3.2 | 2.3 |
| | Tensile strength (MPa) | | 52 | 58 | 62 | 50 |
| | Tensile elongation at break (%) | | 10.0 | 10.4 | 8.0 | 12.0 |
| | Resin toughness K1c (MPa · m$^{0.5}$) | | 2.2 | 1.9 | 2.0 | 2.3 |
| | Glass transition temperature (° C.) | | 133 | 135 | 133 | 135 |
| Storage stability | ΔTg (° C., after 14 days) | | 22 | 1 | 3 | 5 |

TABLE 4-1

| Raw material of epoxy resin composition | | | Example 25 | Example 26 | Example 27 | Example 28 |
|---|---|---|---|---|---|---|
| [A] Bifunctional aliphatic epoxy resin (Formula (I)) | "DENACOL ®"EX-212 | $R^1$ = H, m = 6, n = 1 | | | | |
| | "DENACOL ®"EX-911 | $R^1$ = CH$_3$, m = 2, n = 2 | | | 7 | |
| | "DENACOL ®"EX-920 | $R^1$ = CH$_3$, m = 2, n = 3 | | 11 | | |
| [G] Dicyclopentadiene type epoxy resin | "EPICLON ®"HP7200L | a dicyclopentadiene type epoxy resin | | | | |
| | "EPICLON ®"HP7200 | | | | | 10 |
| [I] Other epoxy resin | "jER ®"828 | Biphenol A type epoxy resin | 67.7 | 39.8 | 45.8 | 55.9 |
| | "jER ®"1001 | | 10 | 10 | | 6 |
| | "jER ®"154 | Phenol novolac type epoxy resin | | | 8 | 8 |
| | "EPICLON ®"830 | Bisphenol F type epoxy resin | | | | |
| Mixture containing boric acid ester compound | "CUREDUCT ®"L-07E | [E] Boric acid ester compound | 0.2 | 0.2 | 0.2 | 0.15 |
| | | Bisphenol A type epoxy resin (component [I]) | 0.2 | 0.2 | 0.2 | 0.15 |
| | | Phenol novolac resin (other additives) | 3.6 | 3.6 | 3.6 | 2.7 |
| Mixture of core-shell type rubber particles and epoxy resin | "KaneAce ®"MX-125 Masterbatch containing 25 mass % of core-shell rubber particles | [D] Core-shell type rubber particle | | 13 | 13 | |
| | | Bisphenol A type epoxy resin (component [I]) | | 39 | 39 | |
| | "KaneAce ®"MX-257 Masterbatch containing 37 mass % of core-shell rubber particles | [D] Core-shell type rubber particle | 13 | | | 12 |
| | | Bisphenol A type epoxy resin (component [I]) | 22.1 | | | 20.4 |
| Thermoplastic resin | "VINYLEC ®"K | PVF | | | | |
| | "SUMIKAEXCEL ®" PES5003P | Polyethersulfone | | | | |

TABLE 4-1-continued

| Raw material of epoxy resin composition | | | Example 25 | Example 26 | Example 27 | Example 28 |
|---|---|---|---|---|---|---|
| [F] Curing agent | DICY7T | [C] Dicyandiamide | 7.5 | 7.7 | 7.6 | 7.5 |
| [H] Curing accelerator | DCMU99 | DCMU | 2.7 | 2.7 | 2.8 | |
| | "Omicure ®"24 | TBDMU | | | | 1.7 |
| Content of component [E]/content of component [D] (mass ratio) | | | 0.015 | 0.015 | 0.015 | 0.013 |
| Viscosity of epoxy resin composition at 25° C. (Pa · s) | | | 21 | 14 | 13 | 18 |
| Properties of cured resin | Tensile elastic modulus (GPa) | | 2.8 | 2.9 | 3 | 3.2 |
| | Tensile strength (MPa) | | 57 | 62 | 61 | 67 |
| | Tensile elongation at break (%) | | 12.0 | 15.0 | 15.0 | 11.0 |
| | Resin toughness K1c (MPa · m$^{0.5}$) | | 2.7 | 2.6 | 2.5 | 2.7 |
| | Glass transition temperature (° C.) | | 136 | 127 | 134 | 143 |
| Storage stability | ΔTg (° C., after 14 days) | | 5 | 4 | 3 | 3 |

TABLE 4-2

| Raw material of epoxy resin composition | | | Example 29 | Example 30 | Example 31 | Example 32 |
|---|---|---|---|---|---|---|
| [A] Bifunctional aliphatic epoxy resin (Formula (I)) | "DENACOL ®"EX-212 | $R^1$ = H, m = 6, n = 1 | | | 6 | |
| | "DENACOL ®"EX-911 | $R^1$ = CH$_3$, m = 2, n = 2 | 7 | | | 6 |
| | "DENACOL ®"EX-920 | $R^1$ = CH$_3$, m = 2, n = 3 | | 10 | | |
| [G] Dicyclopentadiene type epoxy resin | "EPICLON ®"HP7200L | a dicyclopentadiene type epoxy resin | 15 | | 8 | 7 |
| | "EPICLON ®"HP7200 | | | 7 | | |
| [I] Other epoxy resin | "jER ®"828 | Biphenol A type epoxy resin | 57.8 | 52.8 | 38.8 | 37.7 |
| | "jER ®"1001 | | | | | |
| | "jER ®"154 | Phenol novolac type epoxy resin | | | | |
| | "EPICLON ®"830 | Bisphenol F type epoxy resin | | 10 | 10 | 10 |
| Mixture containing boric acid ester compound | "CUREDUCT ®"L-07E | [E] Boric acid ester compound | 0.25 | 0.2 | 0.2 | 0.25 |
| | | Bisphenol A type epoxy resin (component [I]) | 0.25 | 0.2 | 0.2 | 0.25 |
| | | Phenol novolac resin (other additives) | 4.5 | 3.6 | 3.6 | 4.5 |
| Mixture of core-shell type rubber particles and epoxy resin | "KaneAce ®"MX-125 Masterbatch containing 25 mass % of core-shell rubber particles | [D] Core-shell type rubber particle | | | 12 | 13 |
| | | Bisphenol A type epoxy resin (component [I]) | | | 36 | 39 |
| | "KaneAce ®"MX-257 Masterbatch containing 37 mass % of core-shell rubber particles | [D] Core-shell type rubber particle | 12 | 12 | | |
| | | Bisphenol A type epoxy resin (component [I]) | 20.4 | 20.4 | | |
| Thermoplastic resin | "VINYLEC ®"K | PVF | 8.0 | | | |
| | "SUMIKAEXCEL ®" PES5003P | Polyethersulfone | | 7.0 | | |
| [F] Curing agent | DICY7T | [C] Dicyandiamide | 7.3 | 7.4 | 7.4 | 7.3 |
| [H] Curing accelerator | DCMU99 | DCMU | 3 | | | |
| | "Omicure ®"24 | TBDMU | | 1.6 | 1.7 | 1.8 |
| Content of component [E]/content of component [D] (mass ratio) | | | 0.021 | 0.017 | 0.017 | 0.019 |
| Viscosity of epoxy resin composition at 25° C. (Pa · s) | | | 9200 | 8800 | 13 | 13 |
| Properties of cured resin | Tensile elastic modulus (GPa) | | 3.1 | 3.4 | 2.8 | 2.9 |
| | Tensile strength (MPa) | | 65 | 70 | 61 | 63 |
| | Tensile elongation at break (%) | | 13.2 | 13.7 | 14.0 | 13.8 |
| | Resin toughness K1c (MPa · m$^{0.5}$) | | 2.7 | 2.8 | 2.9 | 2.7 |
| | Glass transition temperature (° C.) | | 137 | 142 | 139 | 140 |
| Storage stability | ΔTg (° C., after 14 days) | | 2 | 4 | 4 | 3 |

TABLE 5

| Raw material of epoxy resin composition | | | Example 33 | Example 34 | Example 35 | Example 35 | Example 37 |
|---|---|---|---|---|---|---|---|
| [A] Bifunctional aliphatic epoxy resin (Formula (I)) | "DENACOL ®"EX-212 | $R^1$ = H, m = 6, n = 1 | | 5 | | | |
| | "ADEKA GLYCIROL ®" ED-506 | $R^1$ = CH$_3$, m = 2, n = 6 | 7 | | 7 | 7 | 7 |
| [G] Dicyclopentadiene type epoxy resin | "EPICLON ®"HP7200 | a dicyclopentadiene type epoxy resin | | | | | 48 |
| | "EPICLON ®"HP7200HHH | | 45 | 60 | 30 | 30 | |
| [I] Other epoxy resin | "jER ®"828 | Biphenol A type epoxy resin | 24.5 | 16.1 | 39.5 | 39.5 | 19.5 |
| Mixture containing boric acid ester compound | "CUREDUCT ®"L-07E | [E] Boric acid ester compound | 0.15 | 0.15 | 0.2 | 0.15 | 0.25 |
| | | Bisphenol A type epoxy resin (component [I]) | 0.15 | 0.15 | 0.2 | 0.15 | 0.25 |
| | | Phenol novolac resin (other additives) | 2.7 | 2.7 | 3.6 | 2.7 | 4.5 |
| Mixture of core-shell type rubber particles and epoxy resin | "KaneAce ®"MX-EXP(HM5) Masterbatch containing 30 mass % of core-shell rubber particles | [D] Core-shell type rubber particle | 10 | | | 10 | 11 |
| | | Bisphenol A type epoxy resin (component [I]) | 23.3 | | | 23.3 | 25.7 |
| | "KaneAce ®"MX-267 Masterbatch containing 37 mass % of core-shell rubber particles | [D] Core-shell type rubber particle | | 11 | 13.7 | | |
| | | Bisphenol F type epoxy resin (component [I]) | | 18.7 | 23.3 | | |
| Thermoplastic resin | "Nanostrength ®"M22N | Triblock copolymer | 4 | 5 | 4 | | 4.4 |
| | "Nanostrength ®"M52N | | | | | 2.5 | |
| [F] Curing agent | DICY7T | [C] Dicyandiamide | 5.9 | 5.7 | 6.0 | 5.4 | 5.8 |
| [H] Curing accelerator | DCMU99 | DCMU | 3 | | 3 | 3 | 3 |
| | "Omicure ®"24 | TBDMU | | 1.7 | | | |
| Content of component [E]/content of component [D] (mass ratio) | | | 0.015 | 0.014 | 0.015 | 0.015 | 0.023 |
| Viscosity of epoxy resin composition at 25° C. (Pa · s) | | | 11000 | 12000 | 11300 | 10500 | 9600 |
| Properties of cured resin | Tensile elastic modulus (GPa) | | 3.4 | 2.9 | 2.8 | 3.3 | 3.4 |
| | Tensile strength (MPa) | | 73 | 60 | 58 | 74 | 76 |
| | Tensile elongation at break (%) | | 10.0 | 10.0 | 11.0 | 12.0 | 12.0 |
| | Resin toughness K1c (MPa · m$^{0.5}$) | | 2.0 | 2.1 | 2.3 | 2.2 | 2.2 |
| | Glass transition temperature (° C.) | | 150 | 152 | 147 | 147 | 151 |
| Storage stability | ΔTg (° C., after 14 days) | | 4 | 4 | 3 | 4 | 2 |

TABLE 6-1

| Raw material of epoxy resin composition | | | Comparative Example 1 | Comparative Example 2 | Comparative Example 3 | Comparative Example 4 |
|---|---|---|---|---|---|---|
| [A] Bifunctional aliphatic epoxy resin (Formula (I)) | "DENACOL ®"EX-920 | $R^1$ = H, m = 2, n = 3 | | | | |
| | "DENACOL ®"EX-821 | $R^1$ = CH$_3$, m = 2, n = 4 | | | | |
| [I] Other epoxy resin | "jER ®"828 | Biphenol A type epoxy resin | 25 | 35 | | 60 |
| | "jER ®"1001 | | | 25 | | |
| | "jER ®"154 | Phenol novolac type epoxy resin | | 28 | | 40 |
| | "jER ®"806 | Bisphenol F type | | | 67 | |
| | "Epotohto ®"YDF-2001 | epoxy resin | | | 5 | |
| | TETRAD-X | Xylenediamine type epoxy resin | | | 7 | |
| | "ARALDITE ®"CY-184 | Hexahydrophthalic acid diglycidyl ester | 25 | | | |
| | "DENACOL ®"EX-201 | Resorcinol type epoxy resin | | 12 | | |
| [B] Terminal carboxy-modified acrylic rubber | "Hypro ®"1300x13 | | | | | 15 |
| Mixture of core-shell type rubber particles and epoxy resin | "KaneAce ®"MX-125 Masterbatch containing 25 mass % of core-shell rubber particles | [D] Core-shell type rubber particle | | | 7 | |
| | | Bisphenol A type epoxy resin (component [I]) | | | 21 | |
| | "KaneAce ®"MX-257 Masterbatch containing 37 mass % of core-shell rubber particles | [D] Core-shell type rubber particle | 18.5 | | | |
| | | Bisphenol A type epoxy resin (component [I]) | 31.5 | | | |
| Thermoplastic resin | YP-50 | Phenoxy resin | | | | |
| | "SUMIKAEXCEL ®" PES5003P | Polyethersulfone | | | | |

TABLE 6-1-continued

| Raw material of epoxy resin composition | | | Comparative Example 1 | Comparative Example 2 | Comparative Example 3 | Comparative Example 4 |
|---|---|---|---|---|---|---|
| [F] Dicyandiamide | DICY7T | [C] Dicyandiamide | 4.0 | 4 | 5 | 7 |
| [H] Curing accelerator | DCMU99 | DCMU | | 4 | 4 | 3 |
| | "Omicure ®"24 | TBDMU | | | | |
| | "Omicure ®"94 | PDMU | 1 | | | |
| Other additives | "BYK ®"A 506 | Fluorine-modified polysiloxane (1 mass %, dilution with 99 mass % of cyclohexanone) | 0.3 | | | |
| | XER-91 | NBR particle | | 15 | | |
| Content of component [B]/content of component [D] (mass ratio) | | | — | — | — | — |
| Viscosity of epoxy resin composition at 25° C. (Pa · s) | | | 29 | 72 | 20 | 60 |
| Time taken until Cd reaches 20% (when cured at 150° C., minutes) | | | 6.7 | 4.8 | 5.0 | 5.3 |
| Properties of cured resin | Tensile elastic modulus (GPa) | | 1.9 | 2.5 | 2.8 | 2.7 |
| | Tensile strength (MPa) | | 43 | 45 | 53 | 52 |
| | Tensile elongation at break (%) | | 8.0 | 6.5 | 6.0 | 5.1 |
| | Resin toughness K1c (MPa · m$^{0.5}$) | | 1.7 | 1.8 | 1.6 | 2.0 |
| | Glass transition temperature (° C.) | | 138 | 124 | 115 | 125 |
| Storage stability | ΔTg (° C., after 14 days) | | 32 | 27 | — | — |

TABLE 6-2

| Raw material of epoxy resin composition | | | Comparative Example 5 | Comparative Example 6 | Comparative Example 7 | Comparative Example 8 |
|---|---|---|---|---|---|---|
| [A] Bifunctional aliphatic epoxy resin (Formula (I)) | "DENACOL ®"EX-920 | $R^1$ = CH$_3$, m = 2, n = 3 | | | | 10 |
| | "DENACOL ®"EX-821 | $R^1$ = H, m = 2, n = 4 | 15 | 10 | 10 | |
| [I] Other epoxy resin | "jER ®"828 | Biphenol A type epoxy resin | 60 | 60 | 73 | 80 |
| | "jER ®"1001 | | | | | 10 |
| | "jER ®"154 | Phenol novolac type epoxy resin | 25 | | | |
| | "jER ®"806 | Bisphenol F type epoxy resin | | | | |
| | "Epotohto ®"YDF-2001 | | | | | |
| | TETRAD-X | Xylenediamine type epoxy resin | | | | |
| | "ARALDITE ®"CY-184 | Hexahydrophthalic acid diglycidyl ester | | | | |
| | "DENACOL ®"EX-201 | Resorcinol type epoxy resin | | | | |
| [B] Terminal carboxy-modified acrylic rubber | "Hypro ®"1300x13 | | | | | |
| Mixture of core-shell type rubber particles and epoxy resin | "KaneAce ®"MX-125 Masterbatch containing 25 mass % of core-shell rubber particles | [D] Core-shell type rubber particle Bisphenol A type epoxy resin (component [I]) | | 10 30 | | |
| | "KaneAce ®"MX-257 Masterbatch containing 37 mass % of core-shell rubber particles | [D] Core-shell type rubber particle Bisphenol A type epoxy resin (component [I]) | | | 10 17.0 | |
| Thermoplastic resin | YP-50 | Phenoxy resin | | | 5 | 5 |
| | "SUMIKAEXCEL ®" PES5003P | Polyethersulfone | | | | 5 |
| [F] Dicyandiamide | DICY7T | [C] Dicyandiamide | 6.5 | 7 | 6.8 | 6.8 |
| [H] Curing accelerator | DCMU99 | DCMU | | 3 | | |
| | "Omicure ®"24 | TBDMU | 3 | | 2 | 2 |
| | "Omicure ®"94 | PDMU | | | | |
| Other additives | "BYK ®"A 506 | Fluorine-modified polysiloxane (1 mass %, dilution with 99 mass % of cyclohexanone) | | | | |
| | XER-91 | NBR particle | | | | |

TABLE 6-2-continued

| Raw material of epoxy resin composition | | Comparative Example 5 | Comparative Example 6 | Comparative Example 7 | Comparative Example 8 |
|---|---|---|---|---|---|
| Content of component [B]/content of component [D] (mass ratio) | | — | — | — | — |
| Viscosity of epoxy resin composition at 25° C. (Pa · s) | | 42 | 17 | 103 | 850 |
| Time taken until Cd reaches 20% (when cured at 150° C., minutes) | | 2.5 | 5.1 | 2.8 | 2.4 |
| Properties of cured resin | Tensile elastic modulus (GPa) | 3.0 | 2.7 | 2.8 | 2.9 |
| | Tensile strength (MPa) | 70 | 51 | 50 | 48 |
| | Tensile elongation at break (%) | 5.0 | 5.7 | 4.7 | 4.0 |
| | Resin toughness K1c (MPa · m$^{0.5}$) | 0.6 | 1.7 | 1.7 | 1.2 |
| | Glass transition temperature (° C.) | 123 | 127 | 127 | 128 |
| Storage stability | ΔTg (° C., after 14 days) | — | — | — | — |

TABLE 7

| Raw material of epoxy resin composition | | | Comparative Example 9 | Comparative Example 10 | Comparative Example 11 |
|---|---|---|---|---|---|
| [A] Bifunctional aliphatic epoxy resin (Formula (I)) | "DENACOL ®"EX-920 | R$^1$ = CH$_3$, m = 2, n = 3 | | 10 | 10 |
| [I] Other epoxy resin | "jER ®"828 | Biphenol A type | 40 | 65 | 72.3 |
| | "jER ®"1001 | epoxy resin | 60 | 8 | |
| Mixture containing boric acid ester compound | "CUREDUCT ®"L-07E | [E] Boric acid ester compound | | 0.01 | 0.65 |
| | | Bisphenol A type resin (component [I]) | | 0.01 | 0.65 |
| | | Phenol novolac resin (other additives) | | 0.18 | 11.7 |
| | "CUREDUCT ®"L-01B | [E] Boric acid ester compound | 0.125 | | |
| | | Bisphenol A type resin (component [I]) | 0.125 | | |
| | | Phenol novolac resin (other additives) | 2.25 | | |
| Mixture of core-shell type rubber particles and epoxy resin | "KaneAce ®"MX-125 Masterbatch containing 25 mass % of core-shell rubber particles | [D] Core-shell type rubber particle Bisphenol A type epoxy resin (component [I]) | | | |
| | "KaneAce ®"MX-267 Masterbatch containing 37 mass % of core-shell rubber particles | [D] Core-shell type rubber particle Bisphenol A type epoxy resin (component [I]) | | 10 17.0 | 10 17.0 |
| | "PARALOID ®" EXL-2655 | [D] MBS core-shell type rubber particles | 7 | | |
| [F] Curing agent | DICY7T | [C] Dicyandiamide | 4 | 7 | 7 |
| [H] Curing accelerator | DCMU99 | DCMU | | | |
| | "Omicure ®"24 | TBDMU | | 1.9 | 1.9 |
| | "Omicure ®"94 | PDMU | | | |
| Other additives | "BYK ®"A 506 | Fluorine-modified polysiloxane (1 mass %, dilution with 99 mass % of cyclohexanone) | | | |
| | Imidazole-containing particle | | 4 | | |
| Content of component [B]/content of component [D] (mass ratio) | | | 0.018 | 0.001 | 0.065 |
| Viscosity of epoxy resin composition at 25° C. (Pa · s) | | | 800 | 22 | 15 |
| Properties of cured resin | Tensile elastic modulus (GPa) | | 2.5 | 2.9 | 2.3 |
| | Tensile strength (MPa) | | 45 | 57 | 50 |
| | Tensile elongation at break (%) | | 4.0 | 9.0 | 9.0 |
| | Resin toughness K1c (MPa · m$^{0.5}$) | | 1.5 | 1.6 | 1.5 |
| | Glass transition temperature (° C.) | | 133 | 129 | 126 |
| Storage stability | ΔTg (° C., after 14 days) | | 5 | 32 | 1 |

The unit of each component in the tables is parts by mass.

The epoxy resin composition of the present invention provides a cured product having both deformability and fracture toughness value at a high level, and therefore a fiber-reinforced composite material formed of the epoxy resin composition is excellent in fracture strength and fatigue characteristics. In addition, the epoxy resin composition of the present invention is suitably used as an intermediate base material for producing a fiber-reinforced composite material because the viscosity at normal temperature can be adjusted to a range suitable for producing tow prepregs or to a state favorable for handleability of prepregs.

The invention claimed is:

1. An epoxy resin composition satisfying condition 2 shown below, wherein a cured resin obtained by reacting the epoxy resin composition at 150° C. for 60 minutes has a tensile elongation at break of 7% or more and 20% or less:

condition 2: the epoxy resin composition includes components [D], [E], [F] and [H], and satisfies conditions [a] and [b] shown below, wherein:

[D] is a core-shell rubber particle;

[E] is a boric acid ester compound;

[F] is a curing agent; and

[H] is an aromatic urea compound, condition [a]: the epoxy resin composition includes 9 to 18 parts by mass of the component [D] per 100 parts by mass of total epoxy resin; and condition [b]: 0.003≤ (content of the component [E]/content of the component [D]) ≤0.05.

2. The epoxy resin composition according to claim 1, wherein the epoxy resin composition has a difference in glass transition temperature of 20° C. or less after being stored at 40° C. and 75% RH for 14 days in the condition 2.

3. The epoxy resin composition according to claim 1, comprising:

2 to 10 parts by mass of a triblock copolymer component per 100 parts by mass of total epoxy resin in the condition 2; and 40 to 70 parts by mass of component [G]: a dicyclopentadiene type-epoxy resin per 100 parts by mass of total epoxy resin.

4. An intermediate base material comprising a reinforcing fiber impregnated with the epoxy resin composition according to claim 1.

5. A fiber-reinforced composite material comprising a cured product of the intermediate base material according to claim 4.

* * * * *

UNITED STATES PATENT AND TRADEMARK OFFICE
CERTIFICATE OF CORRECTION

PATENT NO.       : 12,240,975 B2
APPLICATION NO.  : 17/601813
DATED            : March 4, 2025
INVENTOR(S)      : Daisuke Konishi et al.

Page 1 of 1

It is certified that error appears in the above-identified patent and that said Letters Patent is hereby corrected as shown below:

In the Claims

In Column 36, Line 11 in Claim 3 the phrase "type-epoxy" should read -- epoxy --.

Signed and Sealed this
Twenty-fourth Day of June, 2025

Coke Morgan Stewart
*Acting Director of the United States Patent and Trademark Office*